United States Patent
Koyun et al.

(10) Patent No.: US 11,683,298 B2
(45) Date of Patent: *Jun. 20, 2023

(54) SECURE MESSAGING

(71) Applicant: KOBIL Systems GmbH, Worms (DE)

(72) Inventors: Ismet Koyun, Worms (DE); Tan Sarihan, Potomac, MD (US)

(73) Assignee: KOBIL GmbH, Worms (DE)

( * ) Notice: Subject to any disclaimer, the term of this patent is extended or adjusted under 35 U.S.C. 154(b) by 321 days.

This patent is subject to a terminal disclaimer.

(21) Appl. No.: 16/287,846

(22) Filed: Feb. 27, 2019

(65) Prior Publication Data

US 2020/0366652 A1    Nov. 19, 2020

(51) Int. Cl.
*H04L 29/06* (2006.01)
*H04L 9/40* (2022.01)
*H04L 9/14* (2006.01)
*H04L 9/32* (2006.01)

(52) U.S. Cl.
CPC ............ *H04L 63/045* (2013.01); *H04L 9/14* (2013.01); *H04L 9/32* (2013.01)

(58) Field of Classification Search
CPC . H04L 9/14; H04L 9/32; H04L 63/045; H04L 63/107; H04L 63/108; H04L 9/0819; H04L 9/3297; H04L 51/18
See application file for complete search history.

(56) References Cited

U.S. PATENT DOCUMENTS

| | | | |
|---|---|---|---|
| 7,961,879 B1 | 6/2011 | Spies et al. | |
| 2011/0131414 A1* | 6/2011 | Cheng | H04L 63/06 380/279 |
| 2011/0238993 A1* | 9/2011 | Munger | H04L 29/1232 713/168 |
| 2016/0226844 A1 | 8/2016 | Pecka et al. | |
| 2017/0099269 A1 | 4/2017 | Robertson | |
| 2018/0331824 A1* | 11/2018 | Racz | G08B 13/196 |

FOREIGN PATENT DOCUMENTS

| | | |
|---|---|---|
| EP | 1 326 157 A2 | 7/2003 |
| EP | 3 435 621 A1 | 1/2019 |

* cited by examiner

*Primary Examiner* — Joseph P Hirl
*Assistant Examiner* — Leynna Truvan
(74) *Attorney, Agent, or Firm* — Remhart Boerner Van Deuren P.C.

(57) ABSTRACT

Disclosed herein is a method performed by an apparatus. In the method, a payload information item is obtained that is to be communicated to at least one recipient. An encrypted payload information item is obtained by encrypting said payload information item such that it is decryptable by use of a first decryption key and a second decryption key. Further, a message containing said encrypted payload information item is sent or triggered to be sent to said recipient.

2 Claims, 7 Drawing Sheets

600
|  | Expiry date and time | Recipient 1 / Recipient device 200-1 | Recipient 2 / Recipient device 200-2 |
|---|---|---|---|
| Payload Information Item 1 | 11.Nov.2018, 11:11 am | + | − |
| Payload Information Item 2 | 31.Dec.2019, 10:00 am | − | + |
| ... |  |  |  |
"+" = access allowed if not expired
"−" = access not allowed
Fig.6a
700
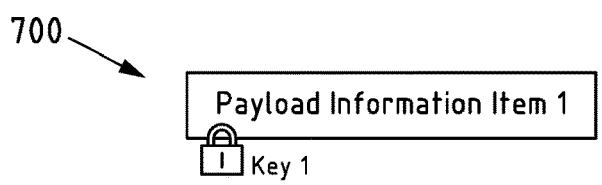
Fig.6b
800
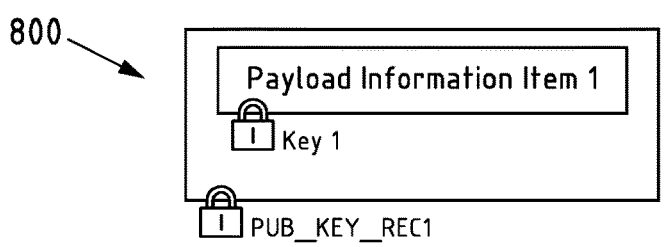
Fig.6c
900
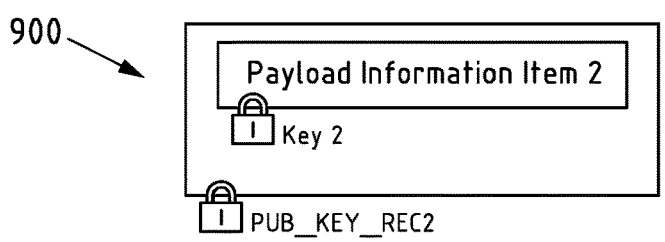
Fig.6d

SECURE MESSAGING

FIELD

The invention relates to the field of secure messaging and more specifically for sending and/or receiving a secure message.

BACKGROUND

For secure messaging, messages may be encrypted today such that a recipient of the message can access the message only if the recipient has access to the decryption key for decrypting the encrypted message. Accordingly, a message only contains information which is intended to be received by all recipients of the message having access to this decryption key.

SUMMARY OF SOME EMBODIMENTS OF THE INVENTION

According to a first aspect of the invention, a method performed by an apparatus is presented, which comprises:
 obtaining a payload information item that is to be communicated to at least one recipient,
 obtaining an encrypted payload information item by encrypting the payload information item such that it (i.e. the encrypted payload information item) is decryptable by use of a first decryption key and a second decryption key,
 sending or triggering sending a message containing the encrypted payload information item to the recipient.

According to the first aspect of the invention, an apparatus is presented, which comprises means for performing the method according to the first aspect of the invention. For example, the method according to the first aspect of the invention may be a method performed by the apparatus according to the first aspect of the invention.

The apparatus and the method according to the first aspect of the invention may be for secure messaging, for example for sending a secure message.

The apparatus according to the first aspect of the invention may be or may be part of a device such as a sender device or a server device (e.g. a key server device), for example a sender device or a server device for a messaging system (e.g. the system according to the third aspect of the invention). Alternatively, the apparatus according to the first aspect of the invention may comprise or may be formed by one or more devices such as a sender device and/or a server device (e.g. a key server device), for example a sender device and/or a server device for a messaging system (e.g. the system according to the third aspect of the invention).

According to the first aspect of the invention, a computer program code is presented, the computer program code when executed by a processor causing an apparatus to perform the actions of the method according to first aspect of the invention.

According to the first aspect of the invention, a computer readable storage medium (e.g. a tangible and/or non-transitory computer readable storage medium) is presented, in which the computer program code according to the first aspect of the invention is stored.

According to a second aspect of the invention, a method performed by an apparatus is presented, which comprises:
 receiving a message containing an encrypted payload information item that is decryptable by use of a first decryption key and a second decryption key,
 obtaining and/or holding available the first decryption key and the second decryption key,
 decrypting the encrypted payload information item by use of the first decryption key and the second decryption key.

According to the second aspect of the invention, an apparatus is presented, which comprises means for performing the method according to the second aspect of the invention. For example, the method according to the second aspect of the invention may be a method performed by the apparatus according to the second aspect of the invention.

The apparatus and the method according to the second aspect of the invention may be for secure messaging, for example for receiving a secure message.

The apparatus according to the second aspect of the invention may be or may be part of a device such as a recipient device or a client device, for example a recipient device or a client device for a messaging system (e.g. the system according to the third aspect of the invention). Alternatively, the apparatus according to the second aspect of the invention may comprise or may be formed by one or more devices such as a recipient device (e.g. a user device) and/or a client device, for example a recipient device (e.g. a user device) and/or a client device for a messaging system (e.g. the system according to the third aspect of the invention).

According to the second aspect of the invention, a computer program code is presented, the computer program code when executed by a processor causing an apparatus to perform the actions of the method according to second aspect of the invention.

According to the second aspect of the invention, a computer readable storage medium (e.g. a tangible and/or non-transitory computer readable storage medium) is presented, in which the computer program code according to the second aspect of the invention is stored.

According to a third aspect of the invention, a method is presented, which comprises the actions of the methods according to the first aspect of the invention and the second aspect of the invention. The method according to the second aspect of the invention may be a method performed in a messaging system (e.g. the system according to the third aspect of the invention).

According to the third aspect of the invention, a system is presented, which comprises at least one apparatus according to the first aspect of the invention and at least one apparatus according to the second aspect of the invention. The system according to the third aspect of the invention may be a messaging system (e.g. a secure messaging system).

In the following, the first, second and third aspects of the invention are—at least partially exemplary—described.

The payload information item (e.g. the payload information item in an unencrypted form) may for example be at least partially obtained by capturing the payload information item (e.g. by a user input means such as a user interface) and/or by receiving the payload information item (e.g. by communication means such as a communication interface) and/or by determining the payload information item (e.g. by determining means such as a processor). To this end, the apparatus performing the method according to the first aspect of the invention (e.g. the apparatus according to the first aspect of the invention) may comprise user input means (e.g. a user interface) and/or communication means (e.g. a communication interface) and/or a determining means (e.g. a processor).

A payload information item may represent information that is to be communicated from a sender to at least one recipient. For example, the payload information item may represent information necessary to perform one or more business processes such as a payment process or a booking process. Accordingly, the encrypted payload information item may represent such information in encrypted form.

A payload information item may be understood to be accessible if it is in an unencrypted form. Accessing an encrypted payload information item of the plurality of encrypted payload information items may thus be understood to mean that the encrypted payload information item is decrypted.

Encrypting the payload information item may be understood to mean that an cryptography algorithm (e.g. an encryption algorithm) is applied to the payload information item; and decrypting the encrypted payload information item may be understood to mean that a cryptography algorithm (e.g. a decryption algorithm) is applied to the decrypted payload information item.

As a result of encrypting the payload information the encrypted payload information item may be obtained. Therein, encrypting the payload information item such that it is decryptable by use of a first decryption key and a second decryption key may mean that for decrypting the encrypted payload information item both the first decryption key and the second decryption key must be used.

Accordingly, decrypting the encrypted payload information item by use of the first decryption key and the second decryption key may mean that both the first decryption key and the second decryption key are used for decrypting the encrypted payload information item. As a result of decrypting the encrypted payload information item the payload information item may be obtained in unencrypted form.

The first decryption key and the second decryption key may be different.

This may have the effect that access to the payload information item may be controlled by controlling access to at least one of the first decryption key and the second decryption key. Accordingly, a recipient (e.g. the at least one recipient) may only access the payload information item if the recipient has access to both the first decryption key and the second decryption key.

Obtaining and/or holding available the first decryption key and the second decryption key may mean that the first decryption key and the second decryption key are obtained, the first decryption key and the second decryption key are hold available or that one of the first decryption key and the second decryption key is obtained and the other one of the first decryption key and the second decryption key is hold available.

The first decryption key and/or the second decryption key may for example be obtained by capturing the first decryption key and/or the second decryption key (e.g. by a user input means such as a user interface) or by receiving the first decryption key and/or the second decryption key (e.g. by communication means such as a communication interface). To this end, the apparatus performing the method according to the second aspect of the invention (e.g. the apparatus according to the second aspect of the invention) may comprise user input means (e.g. a user interface) and/or communication means (e.g. a communication interface).

Holding available the first decryption key and/or the second decryption key may mean that the first decryption key and/or the second decryption key are stored, for example in memory means (e.g. of the apparatus performing the method according to the second aspect of the invention, e.g. the apparatus according to the second aspect of the invention). Example of memory means include a volatile memory and a non-volatile memory.

The message containing the encrypted payload information item may be or may be part of a message according to a message standard such as the Internet Message Format (IMF) which is specified in RFC5322 of the Internet Engineering Task Force (IETF) and/or the Cryptographic Message Syntax (CMS) which is specified in RFCS 652 of the IETF.

The message may at least contain the encrypted payload information item. In addition to the encrypted payload information item, the message containing the encrypted payload information item may for example contain further information items for facilitating and/or controlling communication of the message such as header and/or metadata information items (e.g. a signature information item, a sender information item, a recipient information item, an encryption information item, and/or a message policy information item).

A recipient may be understood to mean a person (e.g. a user) and/or an organization (e.g. a company such as a service provider company) to which the message is sent and/or which receives the message.

Sending the message containing the encrypted payload information item to the recipient may be understood to mean that the message is sent such that it is receivable by the recipient and/or an apparatus of the recipient (e.g. the apparatus according to the second aspect of the invention). For example, the message may be addressed to the recipient and/or to an apparatus of the recipient (e.g. the apparatus according to the second aspect of the invention). For example, the message may comprise an address associated with the recipient (e.g. a recipient identifier and/or a recipient address such as an email address) and/or an address associated with an apparatus of the recipient (e.g. a device identifier and/or a device address such as an IP address and/or a phone number) as a recipient information item. For example, the message may be sent by the apparatus according to the first aspect of the invention. The message may for example be sent by communication means of the apparatus according to the first aspect of the invention, for example a communication interface such as a network interface.

Triggering sending the message containing the encrypted payload information item to the recipient may for example be understood to mean that sending the message to the recipient is controlled by the apparatus performing the method according to the first aspect of the invention (e.g. the apparatus according to the first aspect of the invention). For example, the apparatus performing the method according to the first aspect of the invention (e.g. the apparatus according to the first aspect of the invention) may trigger (e.g. control) external communication means (e.g. communication means external to the apparatus according to the first aspect of the invention) to send the message.

For example, the message containing the encrypted payload information item may be sent in a signal or as part of a signal (e.g. a communication signal). Accordingly, receiving the message containing the encrypted payload information item may be understood to mean that a signal (e.g. a communication signal) comprising the message is received and that the message is extracted from the received signal.

For example, the message containing the encrypted payload information item is received by the apparatus according to the second aspect of the invention. For example, the message is received by communication means of the apparatus according to the second aspect of the invention, for example a communication interface such as a network interface.

The message containing the encrypted payload information item may be sent and/or received via a communication link, for example a network link such as an internet link, a virtual private network link and/or a cellular network link. The communication link may be composed of one or more intermediate communication links and comprise one or more intermediate stations.

The means of the apparatuses according to the first and second aspect of the invention may be implemented in hardware and/or software. They may comprise for example at least one processor for executing computer program code for realizing the required functions, at least one memory storing the program code, or both. Alternatively, they could comprise for example circuitry that is designed to realize the required functions, for example implemented in a chipset or a chip, like an integrated circuit. In general, the means may comprise for example one or more processing means such as a processor and a memory. Optionally, the apparatuses may comprise various other components, like a communication interface (e.g. a network interface such as a network card), a user interface (e.g. a touch-sensitive display, a keyboard, a touchpad, a display, etc.) etc.

For example, the apparatus according to the first aspect of the invention may comprise at least one processor and at least one memory including computer program code, the at least one memory and the computer program code configured to, with the at least one processor, cause an apparatus at least to perform at least partially the method and/or the steps of the method according to the first aspect of the invention. Similarly, the apparatuses according to the second aspect of the invention may comprise at least one processor and at least one memory including computer program code, the at least one memory and the computer program code configured to, with the at least one processor, cause an apparatus at least to perform at least partially the method and/or the steps of the method according to the second aspect of the invention.

As disclosed above, access to the encrypted payload information item may be controlled by controlling access to at least one of the first decryption key and the second decryption key. For example, access to one of the first decryption key and the second decryption key may be controlled by a sender of the message (or a device of the sender of the message, e.g. the apparatus according to the first aspect of the invention) and access to the other one of the first decryption key and the second decryption key may be controlled by the recipient of the message (or an apparatus of the recipient of the message, e.g. the apparatus according to the second aspect of the invention).

The present invention thus enables to control access to the encrypted payload information item by both the sender and the recipient. This for example allows the sender to withdraw the encrypted payload information item or restrict access to the encrypted payload information item after the message containing the encrypted payload information item has been sent to the recipient.

In the following, the features of exemplary embodiments according to the invention are described by way of examples.

According to an exemplary embodiment of the invention, the encrypted payload information item is obtained by encrypting the payload information item in at least two subsequent encrypting steps. Accordingly, the encrypted payload information item may be decrypted by decrypting the encrypted payload information item in at least two subsequent decrypting steps.

The encrypted payload information item may be obtained as a result of these subsequent encrypting steps. For example, different encryption keys and/or cryptography algorithms may be used for encrypting the payload information item in these subsequent encrypting steps. Furthermore, the encrypted payload information item may be decrypted by these subsequent decrypting steps which may correspond to (e.g. reverse) these subsequent encrypting steps. For example, different decryption keys and/or cryptography algorithms may be used for decrypting the encrypted payload information item in these subsequent decrypting steps, wherein the different decryption keys and/or cryptography algorithms correspond to the encryption keys and/or cryptography algorithms used for encrypting the payload information item.

For example, obtaining the encrypted payload information item according to the method of the first aspect of the invention may comprise:
  obtaining, in a first encrypting step of the at least two subsequent encrypting steps, an intermediate encrypted payload information item by encrypting the payload information item such that it (i.e. the intermediate encrypted payload information item) is decryptable by use of the second decryption key, and
  obtaining, in a second encrypting step of the at least two subsequent encrypting steps, the encrypted payload information item by encrypting the intermediate encrypted payload information item such that it (i.e. the encrypted payload information item) is decryptable by use of the first decryption.

Accordingly, decrypting the encrypted payload information item according to the method of the second aspect of the invention may comprise:
  obtaining, in a first decrypting step of the at least two subsequent decrypting steps, an intermediate decrypted payload information item by decrypting the encrypted payload information item by use of the second decryption key, and
  obtaining, in a second decrypting step of the at least two subsequent decrypting steps, the payload information item by decrypting the intermediate decrypted payload information item such by use of the first decryption.

According to an exemplary embodiment of the invention, the encrypted payload information item is encrypted and/or decryptable by use of at least one asymmetric cryptography algorithm, at least one symmetric cryptography algorithm or a combination thereof.

As disclosed above, encrypting of the payload information item and decrypting of the encrypted payload information item may be performed in at least two subsequent steps (e.g. subsequent encrypting steps and/or subsequent decrypting steps). In this case, in each subsequent step a different cryptography algorithm may be used. For example, in a first step a first cryptography algorithm (e.g. a first asymmetric or symmetric cryptography algorithm) may be used, and in a second step a second cryptography algorithm (e.g. a second asymmetric or symmetric cryptography algorithm) may be used. Alternatively, in some subsequent steps or in each subsequent step the same cryptography algorithm may be used. For example, in a first step and a second step the same cryptography algorithm (e.g. the same asymmetric or symmetric cryptography algorithm) may be used.

In case the encrypted payload information items is encrypted and/or decryptable by use of at least one asymmetric cryptography algorithm or a combination of at least one asymmetric and at least one symmetric cryptography algorithm, at least one of the first decryption key and the second decryption key may be a private key or an public of an asymmetric key pair. In case the encrypted payload information item is encrypted and/or decryptable by use of at least one symmetric cryptography algorithm or a combination of at least one asymmetric and at least one symmetric cryptography algorithm, at least one of the first decryption key and the second decryption key may be a symmetric key.

An example of an asymmetric cryptography algorithm is the RSA-Algorithm (Rivest-Shamir-Adleman-Algorithm). The RSA-Algorithm is for example specified in Public-Key Cryptography Standards #1 (PKCS #1) as published by the RSA Laboratories. Exemplary symmetric cryptography algorithms are the Advanced Encryption Standard (AES-Algorithm) and the Triple Data Encryption Algorithm (3DEA-Algorithm). The AES-Algorithm and the 3DEA-Algorithm are for example specified by the U.S. National Institute of Standards and Technology (NIST).

According to an exemplary embodiment of the invention, one of the first decryption key and the second decryption key is associated with and/or accessible to the recipient, wherein access to the other one of the first decryption key and the second decryption key is controlled by the sender of the message containing the encrypted payload information item and/or the apparatus performing the method (e.g. an apparatus of the sender, e.g. the apparatus according to the first aspect of the invention).

A decryption key may be understood to be associated with and/or accessible to a recipient if the decryption key is associated with and/or accessible to an apparatus of the recipient (e.g. the apparatus according to the second aspect of the invention), for example if the decryption key is stored in memory means of the apparatus of the recipient (e.g. the apparatus according to the second aspect of the invention). Alternatively or additionally, a decryption key may be understood to be associated with and/or accessible to a recipient if the decryption key has been previously exchanged with (e.g. send to and/or received from) the recipient and/or an apparatus of the recipient (e.g. the apparatus according to the second aspect of the invention).

For example, access to a decryption key may be understood to be controlled by the apparatus performing the method of the first aspect of the invention (e.g. the apparatus of the first aspect of the invention), if this decryption key is hold available by the apparatus (e.g. stored in memory means of the apparatus) and the apparatus (e.g. only) sends or triggers sending this decryption key to the recipient if it is determined that the recipient is allowed to access the payload information item as disclosed below.

According to an exemplary embodiment of the invention, at least one of the first decryption key and the second decryption key is a public key or a private key of an asymmetric key pair. For example, the asymmetric key pair may be used for encrypting and decrypting information items that are communicated to the recipient. For example, such an asymmetric key pair may be generated for securing communication with the recipient or for securing communication with the sender.

According to an exemplary embodiment of the invention, at least one of the first decryption key and the second decryption key is a symmetric key. For example, such a symmetric key may be a one-time key that is only used for encrypting and decrypting the payload information item that is to be communicated to the recipient.

According to an exemplary embodiment of the invention, the method according to the first aspect of the invention further comprises:
  receiving a request for one of the first decryption key and the second decryption key from the recipient,
  sending or triggering sending the requested one of the first decryption key and the second decryption key to the recipient in response to the request.

Furthermore, one of the first decryption key and the second decryption key may be obtained according to the method according to the second aspect of the invention by:
  sending or triggering sending a request for the one of the first decryption key and the second decryption key to a sender of the message containing the encrypted payload information item, and
  receiving the requested one of the first decryption key and the second decryption key from the sender in response to the request.

A sender may be understood to mean a person (e.g. a user) and/or an organization (e.g. a company such as a service provider company) from which the message containing the encrypted payload information item is sent and/or which triggers (e.g. initiates or controls) sending the message.

Sending the request to the sender may be understood to mean that the request is sent such that it is receivable by the sender and/or an apparatus of the sender used for sending the message (e.g. the apparatus according to the first aspect of the invention). For example, the request may be addressed to the sender and/or to an apparatus of the sender used for sending the message (e.g. the apparatus according to the first aspect of the invention). For example, the request may comprise an address associated with the sender (e.g. a sender identifier and/or a sender address such as an email address) and/or an address associated with an apparatus of the sender used for sending the message (e.g. a device identifier and/or a device address such as an IP address and/or a phone number) as a recipient information item. For example, the request may be sent by the apparatus according to the second aspect of the invention. The request may for example be sent by communication means of the apparatus according to the second aspect of the invention, for example a communication interface such as a network interface.

Triggering sending the request to the sender may for example be understood to mean that sending the request to the sender is controlled by the apparatus performing the method according to the second aspect of the invention (e.g. the apparatus according to the second aspect of the invention). For example, the apparatus performing the method according to the second aspect of the invention (e.g. the apparatus according to the second aspect of the invention) may trigger (e.g. control) external communication means (e.g. communication means external to the apparatus according to the second aspect of the invention) to send the request.

Sending the request may be understood to mean that a signal (e.g. a communication signal) comprising the request is sent. Receiving the request may accordingly be understood to mean that a signal (e.g. a communication signal) comprising the request is received and that the request is extracted from the received signal.

For example, the request is received by the apparatus according to the first aspect of the invention. For example, the request is received by communication means of the apparatus according to the first aspect of the invention for example a communication interface such as a network interface.

The request may be sent and/or received via a communication link, for example a network link such as an internet link, a virtual private network link and/or a cellular network link.

Sending or triggering sending the requested one of the first decryption key and the second decryption key to the recipient in response to the request may be performed similar to sending or triggering sending the message containing the encrypted payload information item to the recipient as disclosed above. For example, a message containing the one of the first decryption key and the second decryption key may be sent or triggered to be sent to the recipient. Accordingly, receiving the requested one of the first decryption key and the second decryption key may be performed similar to receiving the message containing the encrypted payload information item as disclosed above. For example, a message containing the one of the first decryption key and the second decryption key may be received.

For example, the method according to the first aspect of the invention may comprise:
  determining whether the recipient is allowed to access the encrypted payload information item, wherein the requested one of the first decryption key and the second decryption key is only sent or triggered to be sent to the recipient in response to the request, if it is determined that the recipient is allowed to access the encrypted payload information item.

For example, determining whether the recipient is allowed to access the payload information item is at least partially based on an authentication information item contained in the request for authenticating the recipient, an identification information item contained in the request for identifying the recipient, a validity time of the payload information item, a validity time of the requested one of the first decryption key and the second decryption key, a geographical validity of the one of the first decryption key and the second decryption key or a combination thereof. Accordingly, the request may contain an identification information item for identifying the recipient and/or an authentication information item for authenticating the recipient.

The determining whether the at least one recipient is allowed to access the payload information item is for example based on access rules for the encrypted payload information item. For example, such access rules may define which recipient(s) are allowed to access the encrypted payload information items of the plurality of encrypted payload information. Alternatively or additionally, such access rules may define a validity time and/or a geographical validity for the encrypted payload information item. For example, the validity time may indicate a date and time when the encrypted payload information item expires, wherein access to the encrypted payload information item is not allowed if it is expired. The geographical validity may restrict the location where access to the encrypted payload information item is allowed (e.g. only online, only offline, only at a certain geolocation, etc.). An example of access rules is an access rule matrix, for example an access rule matrix defining a validity time and/or a geographical validity for the encrypted payload information item and which recipient(s) are allowed to access the encrypted payload information item.

This exemplary embodiment of the invention may have the effect that access to the encrypted payload information item is controlled by requiring the recipient to request the sender for at least one of the first decryption key and the second decryption key if the recipient desires to access the encrypted payload information item. Accordingly, changes in access rules after sending the message containing the encrypted payload information item may be also enforced by this exemplary embodiment.

According to an exemplary embodiment of the invention, the message containing the encrypted payload information item further contains at least one of:
  a signature information item,
  a recipient information item,
  a key information item,
  an encryption information item, and
  a message policy information item.

A signature information item may for example represent a digital signature of the message such as signature according to the RSASSA-PSS signature algorithm as specified in PKCS #1. Such a digital signature may allow to verify whether the message was created by a known sender, that the sender cannot deny having sent the message and/or that the message was not altered in transit.

A sender information item and a recipient information item may for example represent a address associated with the sender and an address associated with the recipient (e.g. a recipient identifier and/or a recipient address such as an email address) and/or an address associated with an apparatus of the sender and an address associated with an apparatus of the recipient (e.g. a device identifier and/or a device address such as an IP address and/or a phone number). This may allow routing the message from the sender and/or an apparatus of the sender to the recipient and/or an apparatus of the recipient.

An encryption information item may for example identify the cryptography algorithm(s) used for encrypting the encrypted payload information item.

A message policy information item may for example define policy rules for accessing and/or processing the message and/or the encrypted payload information item. For example, the message policy information item defines a date and time when the message expires and/or restricts the location where the message may be opened (e.g. only online, only offline, only at a certain geolocation, etc.) and/or requires additional user identification before the message and/or the encrypted payload information item may be accessed (e.g. by requiring input of a password).

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

BRIEF DESCRIPTION OF THE FIGURES

FIGS. 6a-d are exemplary embodiments of an access rule matrix, an intermediate encrypted/decrypted payload information item and encrypted payload information items according to the invention.

DETAILED DESCRIPTION

Figure 1:
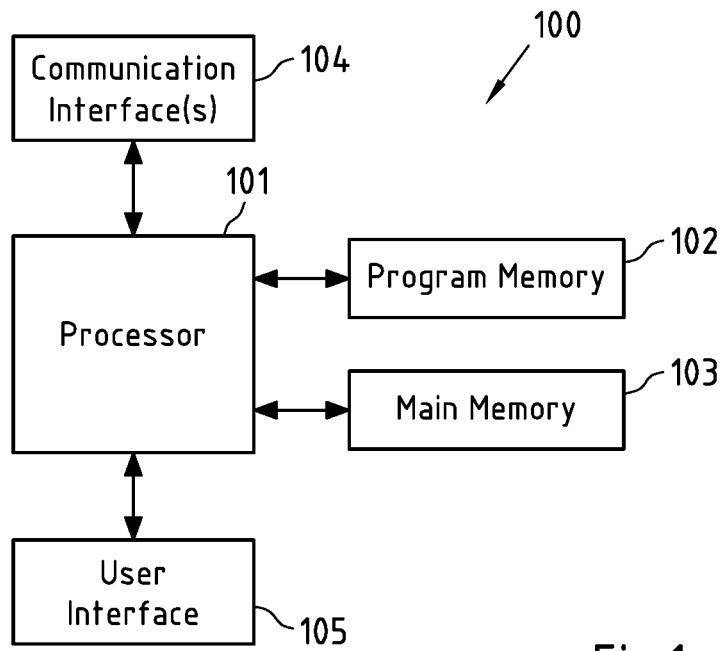
FIG. 1 is a block diagram of an exemplary embodiment of an apparatus according to the first aspect of the invention.

FIG. 1 is a block diagram of an exemplary embodiment of an apparatus according to the first aspect of the invention. In the following, it is assumed that the apparatus is a sender device 100.

Sender device 100 comprises a processor 101. Processor 101 may represent a single processor or two or more processors, which are for example at least partially coupled, for example via a bus. Processor 101 executes a program code stored in program memory 102 (for example program code causing sender device 100 to perform one or more of the embodiments of a method (or parts thereof) according to the first aspect of the invention (as for example further described below with reference to FIGS. 4a and 4b), when executed on processor 101), and interfaces with a main memory 103.

Some or all of memories 102 and 103 may also be included into processor 101. One of or both of memories 102 and 103 may be fixedly connected to processor 101 or at least partially removable from processor 101, for example in the form of a memory card or stick.

Program memory 102 may for example be a non-volatile memory. It may for example be a FLASH memory (or a part thereof), any of a ROM, PROM, EPROM, MRAM or a FeRAM (or a part thereof) or a hard disc (or a part thereof), to name but a few examples. Program memory 102 may also comprise an operating system for processor 101. Program memory 102 may for example comprise a first memory portion that is fixedly installed in sender device 100, and a second memory portion that is removable from sender device 100, for example in the form of a removable SD memory card.

Main memory 103 may for example be a volatile memory. It may for example be a DRAM memory, to give non-limiting example. It may for example be used as a working memory for processor 101 when executing an operating system and/or programs.

Processor 101 further controls a communication interface 104 configured to send and/or receive information such as messages via a communication link. For example, the communication interface 104 is configured to send and/or receive information in a signal or as part of a signal (e.g. a communication signal) via a communication link. An example of a communication interface is a network interface such as a network card.

Furthermore, processor 101 may further control an optional user interface 105 configured to present information to a user of sender device 100 and/or to receive information from such a user (e.g. by capturing user input). User interface 105 may for instance be the standard user interface via which a user of ender device 100 controls other functionality thereof, such as browsing the internet, etc. Examples of such a user interface are a touch-sensitive display, a keyboard, a touchpad, a display, etc.

The components 102-105 of sender device 100 may for example be connected with processor 101 by means of one or more serial and/or parallel busses.

It is to be understood that sender device 100 may comprise various other components.

Figure 2:
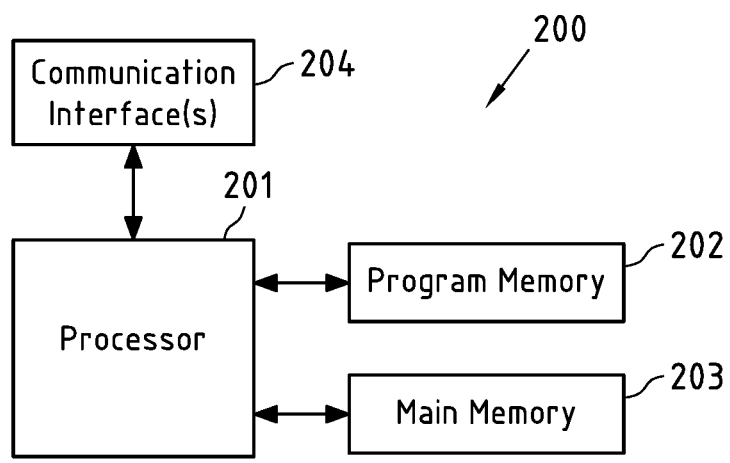
FIG. 2 is a block diagram of an exemplary embodiment of an apparatus according to the second aspect of the invention.

FIG. 2 is a block diagram of an exemplary embodiment of an apparatus according to the second aspect of the invention. In the following, it is assumed that the apparatus is a recipient device 200.

Recipient device 200 comprises a processor 201. Processor 201 may represent a single processor or two or more processors, which are for example at least partially coupled, for example via a bus. Processor 201 executes a program code stored in program memory 202 (for example program code causing recipient device 200 to perform one or more of the embodiments of a method (or parts thereof) according to the second aspect of the invention (as for example further described below with reference to FIGS. 5a to 5c), when executed on processor 201), and interfaces with a main memory 203.

Some or all of memories 202 and 203 may also be included into processor 201. One of or both of memories 202 and 203 may be fixedly connected to processor 201 or at least partially removable from processor 201, for example in the form of a memory card or stick. Program memory 202 may for example be a non-volatile memory. It may for example be a FLASH memory (or a part thereof), any of a ROM, PROM, EPROM, MRAM or a FeRAM (or a part thereof) or a hard disc (or a part thereof), to name but a few examples.

Program memory 202 may also comprise an operating system for processor 201. Program memory 202 may for example comprise a first memory portion that is fixedly installed in recipient device 200, and a second memory portion that is removable from recipient device 200, for example in the form of a removable SD memory card.

Main memory 203 may for example be a volatile memory. It may for example be a DRAM memory, to give non-limiting example. It may for example be used as a working memory for processor 201 when executing an operating system and/or programs.

Processor 201 further controls a communication interface 204 configured to send and/or receive information such as messages via a communication link. For example, the communication interface 204 is configured to send and/or receive information in a signal or as part of a signal (e.g. a communication signal) via a communication link. An example of a communication interface is a network interface such as a network card.

The components 202-204 of recipient device 200 may for example be connected with processor 201 by means of one or more serial and/or parallel busses.

It is to be understood that recipient device 200 may comprise various other components such as a user interface (e.g. a touch-sensitive display, a keyboard, a touchpad, a display, etc.).

Figure 3:
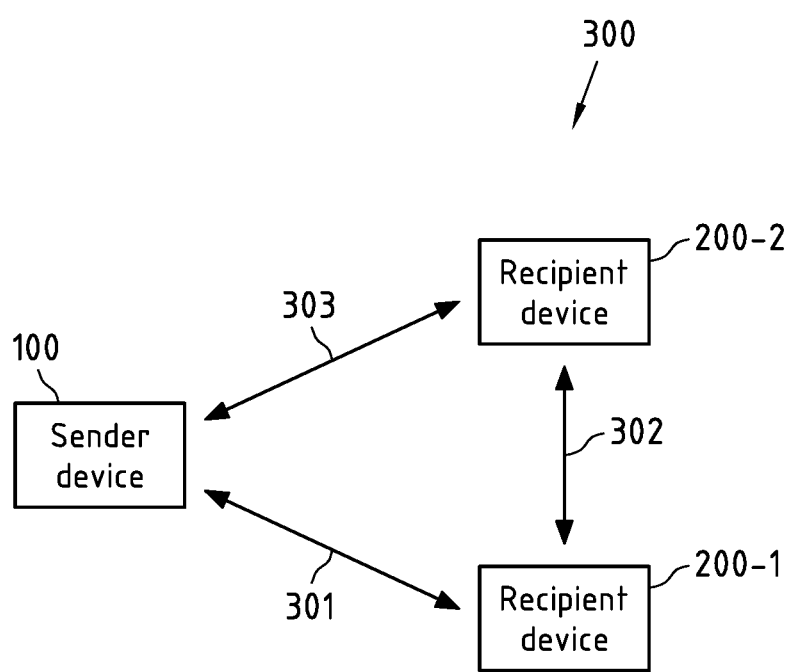
FIG. 3 is a block diagram of an exemplary embodiment of a system according to the third aspect of the invention.

FIG. 3 is a block diagram of an exemplary embodiment of a system 300 according to the third aspect of the invention.

System 300 comprises a sender device 100 and recipient devices 200-1 and 200-2. Sender device 100 corresponds to the sender device 100 of FIG. 1 as disclosed above; and each of recipient devices 200-1 and 200-2 corresponds to recipient device 200 of FIG. 2 as disclosed above.

Sender device 100 and recipient devices 200-1 and 200-2 may communicate with each other via communication links 301, 302 and 303 respectively.

System 300 may optionally comprise further entities such as a key server device (e.g. a public key server device) and/or further sender devices and/or further recipient devices.

Figure 4A:
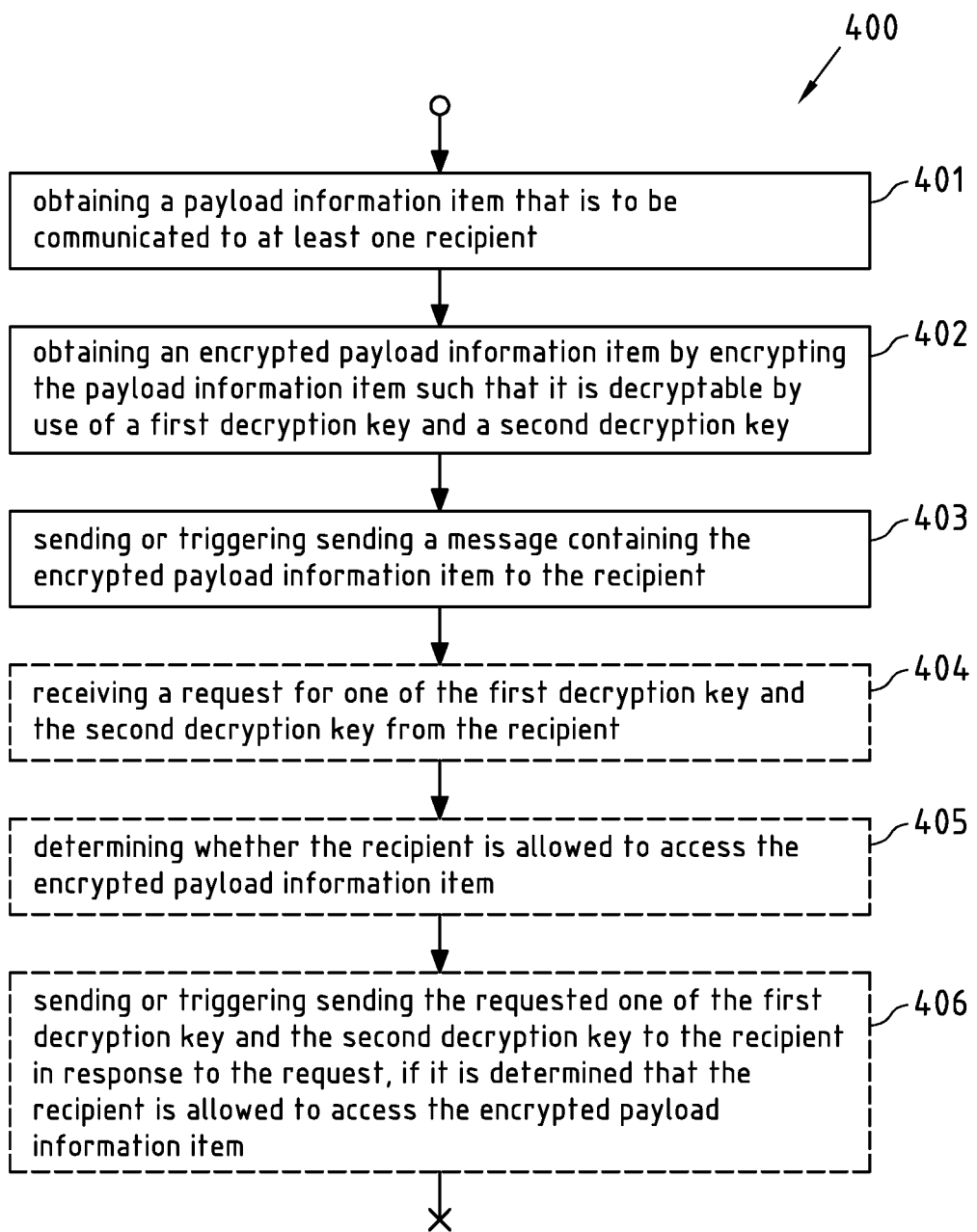
FIGS. 4a-b are flowcharts of exemplary embodiments of a method according to the first aspect of the invention.

FIG. 4a is a flow chart 400 illustrating an exemplary embodiment of a method according to the first aspect of the invention. The actions of flow chart 400 may be performed by sender device 100, for example. In the following, it is assumed that processor 101 and the program code stored in memory 102 of sender device 100 may cause the sender device 100 to perform all or some of actions 401 to 406 when program code is retrieved from program memory 102 and executed by processor 101. Furthermore, it is assumed that sender device 100 is part of system 300 described above with respect to FIG. 3.

Sender device 100 obtains a payload information item that is to be communicated to at least one recipient (action 401). For example, the payload information item may be received by communication interface 104 and/or captured as user input by optional user interface 105 in action 401. Alternatively or additionally, the payload information item may be at least partially determined in step 401 (e.g. by processor 101).

The payload information item may represent information that is to be communicated from a sender to at least one recipient. A sender may be understood to mean a person (e.g. a user) and/or an organization (e.g. a company such as a service provider company) which triggers (e.g. initiates or controls) communication of the payload information item by sender device 100, and a recipient may be understood to mean a person (e.g. a user) and/or an organization (e.g. a company such as a service provider company) to which the payload information item is to be communicated. For example, the payload information item may represent information necessary to perform one or more business processes such as a payment process or a booking process.

In the following, it is assumed that the payload information item represents information that is to be communicated from a sender using sender device 100 to at least one recipient using recipient device 200-1.

Sender device 100 obtains an encrypted payload information item by encrypting the payload information item such that it is decryptable by use of a first decryption key and a second decryption key (action 402).

Encrypting the payload information item such that it is decryptable by use of a first decryption key and a second decryption key may mean that for decrypting the encrypted payload information item both the first decryption key and the second decryption key must be used.

Figure 4B:
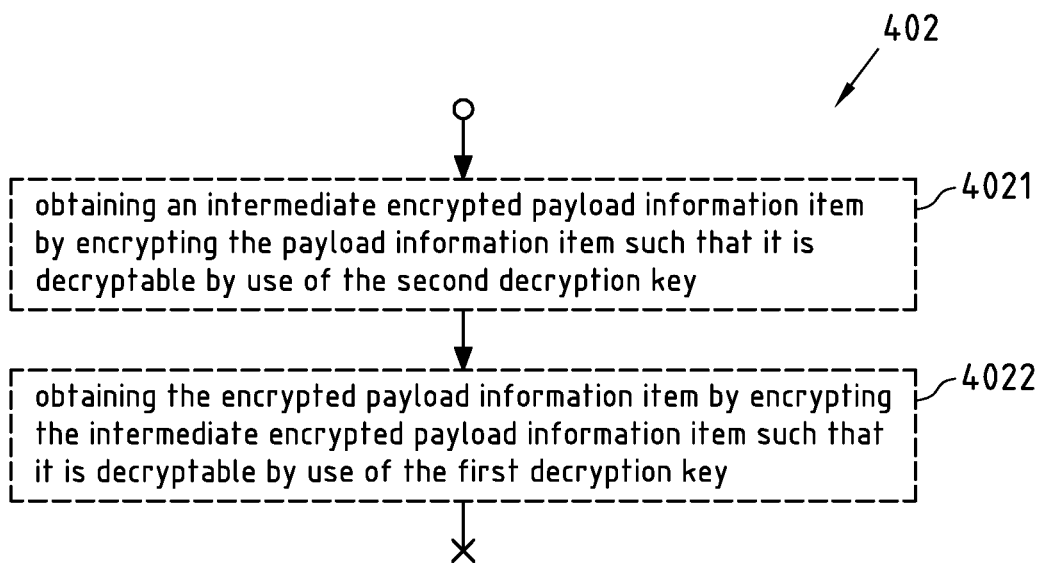

Without limiting the scope of the invention, it is assumed in the following that the encrypted payload information item is obtained by encrypting the payload information item in at least two subsequent encrypting steps in action 402 as exemplary shown in FIG. 4b.

In a first encrypting step 4021, sender device 100 obtains an intermediate encrypted payload information item by encrypting the payload information item such that it is decryptable by use of the second decryption key.

For example, the payload information item may be encrypted by use of a symmetric cryptography algorithm in the first encrypting step 4021. Accordingly, the second decryption key may be a symmetric key which is used for encrypting (e.g. encrypting in the first encrypting step 4021) and decrypting (e.g. decrypting in the second decrypting step 5032 as disclosed below). This may have the effect that access to the encrypted payload information item is restricted to recipients having access to this symmetric key (i.e. the second decryption key).

Using a symmetric cryptography algorithm allows to reduce the processing time and/or capacity for encrypting and/or decrypting compared to an asymmetric cryptography algorithm. As disclosed above, exemplary symmetric cryptography algorithms are the AES-Algorithm and the 3DEA-Algorithm.

As a result of the first encrypting step 4021, the intermediate encrypted payload information item is obtained, wherein the intermediate encrypted payload information is decryptable by the second decryption key.

An exemplary embodiment of such an intermediate encrypted payload information item 700 is shown in FIG. 6b. As indicated in FIG. 6b, intermediate encrypted payload information item 700 is encrypted by Kelly and contains payload information item 1.

In a second encrypting step 4022, the sender device 100 obtains the encrypted payload information item by encrypting the intermediate payload information item such that it is decryptable by use of the first decryption key.

For example, the intermediate encrypted payload information item may be encrypted by use of an asymmetric cryptography algorithm in the second encrypting step 4022.

For example, the first decryption key may be a private key of an asymmetric key pair associated with and/or accessible to the at least one recipient. This may have the effect that access to the encrypted payload information item is restricted to recipients being associated with and/or having access to the private key of this asymmetric key pair (i.e. the first decryption key). The first decryption key may be understood to be associated with and/or accessible to the at least one recipient if the first decryption key is stored in program memory 202 of recipient device 200-1.

The sender device 100 may receive the public key of this asymmetric key pair for encrypting the intermediate encrypted payload information item in step 4022 from the recipient device 200-1 and/or a public key server (e.g. a public key server of system 300).

As a result of the second encrypting step 4022, the encrypted payload information item is obtained.

An exemplary embodiment of such an encrypted payload information item 800 is shown in FIG. 6c. As indicated in FIG. 6c, encrypted payload information item 800 is encrypted by PUB_Key_Rec1 and contains intermediate encrypted payload information item 700 which is encrypted by Kelly. Encrypted payload information item 800 is thus to be understood to be encrypted twice (i.e. by both PUB_Key_Rec1 and Key1).

PUB_Key_Rec1 may be a public key of an asymmetric key pair associated with and/or associable to the recipient using recipient device 200-1 (e.g. PRIV_key_Rec1 which is the private key of this asymmetric key pair is only stored in program memory 102 of recipient device 200-1). Furthermore, Key1 is for example a symmetric key. Access to Key1 may be controlled by sender device 100. For example, Key1 may be generated by sender device 100 for encrypting payload information item 1 and may be only stored in program memory 102 of sender device 100. This may have the effect that access to the encrypted payload information item may be controlled by the sender or sender device 100 which controls access to Key1 (i.e. the second decryption key) and the recipient which is associated with and/or has access to PRIV_key_Rec1 (i.e. the first decryption key).

Sender device 100 sends or triggers sending a message containing the encrypted payload information item to the recipient (action 403). Sending the message to at least one recipient may be understood to mean that the message is sent such that it is receivable by the recipient device 200-1. For example, the message is sent by sender device 100 via communication link 301 to recipient device 200-1.

Furthermore, the message may be sent by sender device 100 to one or more further recipients (e.g. to recipient device 200-2).

Optionally, sender device 100 may receive a request for one of the first decryption key and the second decryption key from the recipient (action 404). For example, the request may be understood to be received from the recipient if it is received from a device used by the recipient and/or if it contains an identification information item identifying the recipient. For example, the request is received from recipient device 200-1 in action 404.

In response to the request, sender device 100 determines whether the recipient is allowed to access the encrypted payload information item (action 405).

As disclosed above, determining whether the recipient is allowed to access the encrypted payload information item may be at least partially based on an authentication information item contained in the request for authenticating the recipient, an identification information item contained in the request for identifying the recipient, a validity time of the payload information item, a validity time of the requested one of the first decryption key and the second decryption key, a geographical validity of the one of the first decryption key and the second decryption key or a combination thereof.

The determining is for example based on access rules for one or more encrypted payload information items. For example, such access rules define which recipient(s) are allowed to access which encrypted payload information. Alternatively or additionally, such access rules may define a validity time and/or a geographical validity for the encrypted payload information item. For example, the validity time may indicate a date and time when the encrypted payload information item expires, wherein access to the encrypted payload information item is not allowed if it is expired. The geographical validity may restrict the location where access to the encrypted payload information item is allowed (e.g. only online, only offline, only at a certain geolocation, etc.). The access rules may be received and/or hold available by the sender device 100. For example, the access rules may be at least partially received by communication means 104 and/or by capturing user input by optional user interface 105. Alternatively or additionally, the access rules may be at least partially stored in program memory 102. The first decryption key may be understood to be associated with and/or accessible to the at least one recipient if the first decryption key is stored in program memory 202 of recipient device 200-1.

An example of access rules is an access rule matrix. An exemplary embodiment of such an access rule matrix 600 for a recipient using recipient device 200-1 and a recipient using recipient device 200-2 is shown in FIG. 6a. As indicated in access rule matrix 600, the first recipient is allowed to have access to payload information item 1 if it is not expired, and the second recipient is allowed to have access to payload information item 2 if it is not expired. Therein, payload information item 1 expires on 11. November 2018 at 11:11 am, and payload information item 2 expires on 31. December 2019 at 10:00 am.

For example, the request received in action 404 may be a request for Key1 and may contain an identification information item identifying the recipient using recipient device 200-1. As disclosed above, Key1 may be used for decrypting encrypted payload information item 800 which contains payload information item 1 in encrypted form. If the request is received before 11. November 2018, 11:11 am, it may be determined based on access rule matrix 600 in action 405 that the recipient using recipient device 200-1 (i.e. the recipient identified by the identification information item contained in the request) is allowed to access the encrypted payload information item 800 which contains payload information item 1 in encrypted form. Otherwise, it may be determined based on access rule matrix 600 in action 405 that the recipient using recipient device 200-1 is not allowed to access the encrypted payload information item 800 which contains payload information item 1 in encrypted form.

If it is determined in action 405 that the recipient is allowed to access the encrypted payload information item, the sender device 100 sends or triggers sending the requested one of the first decryption key and the second decryption key (e.g. Key1 as disclosed above) to the recipient (action 406). Otherwise, the flowchart 400 may be terminated.

Sending the requested one of the first decryption key and the second decryption key to the recipient may be understood to mean that the requested one of the first decryption key and the second decryption key (e.g. Key1 as disclosed above) is sent such that it is receivable by the recipient device 200-1. For example, the requested one of the first decryption key and the second decryption key (e.g. Key1 as disclosed above) is sent by sender device 100 via communication link 301 to recipient device 200-1. For example, a message containing the requested one of the first decryption key and the second decryption key may be sent in action 406 to the recipient.

Figure 5A:
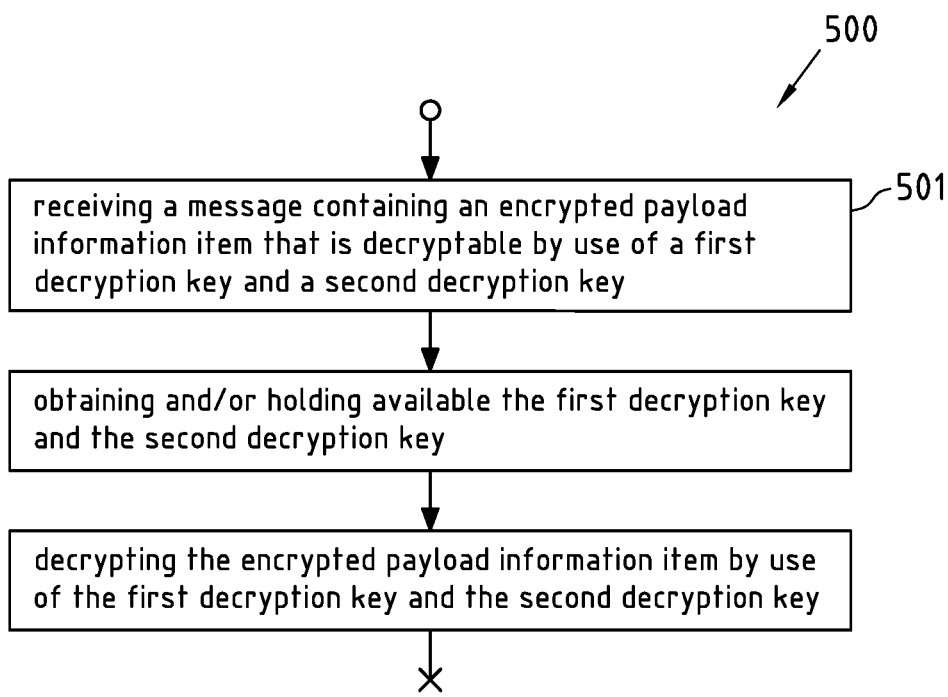
FIGS. 5a-c are flowcharts of exemplary embodiments of a method according to the second aspect of the invention.

FIG. 5a is a flow chart 500 illustrating an exemplary embodiment of a method according to the second aspect of the invention. The actions of flow chart 500 may be performed by recipient device 200-1 of system 300 described above with respect to FIG. 3, for example. In the following, it is assumed that processor 201 and the program code stored in memory 202 of recipient device 200-1 may cause the recipient device 200-1 to perform all or some of actions 501 to 503 when program code is retrieved from program memory 202 and executed by processor 201.

The recipient device 200-1 receives a message containing an encrypted payload information item that is decryptable by use of a first and a second decryption key (action 501). For example, the message is received by recipient device 200-1 via communication link 301 from sender device 100.

Without limiting the scope of the invention, it is assumed in the following that the message received in action 501 corresponds to the message sent in action 403 of flowchart 400 as disclosed above. For example, the message contains encrypted payload information 800 which contains payload information item 1 in encrypted form as shown in FIG. 6c.

As disclosed above, a recipient may be understood to mean a person (e.g. a user) and/or an organization (e.g. a company such as a service provider company) to which the message is sent and/or which receives the message. By receiving the message by the recipient device 200-1 the message may thus be understood to be received by the recipient using recipient device 200-1.

The recipient device 200-1 obtains and/or holds available the first decryption key and the second decryption key (action 602).

As disclosed above, obtaining and/or holding available the first decryption key and the second decryption key may mean that the first decryption key and the second decryption key are obtained, the first decryption key and the second decryption key are hold available or that one of the first decryption key and the second decryption key is obtained and the other one of the first decryption key and the second decryption key is hold available.

Holding available the first decryption key and/or the second decryption key may mean that the first decryption key and/or the second decryption key are stored in program memory 202 of recipient device 200-1. Alternatively or additionally, the first decryption key and/or the second decryption key may for example be obtained by receiving the first decryption key and/or the second decryption key by communication interface 204 of recipient device 200-1.

For example, PRIV_Key_Rec1 which is the first decryption key for decrypting encrypted payload information item 800 is stored in program memory 202 of recipient device 200-1, whereas Key1 which is the second decryption key for decrypting the encrypted payload information item 800 may be only stored in program memory 102 of sender device 100.

Figure 5B:
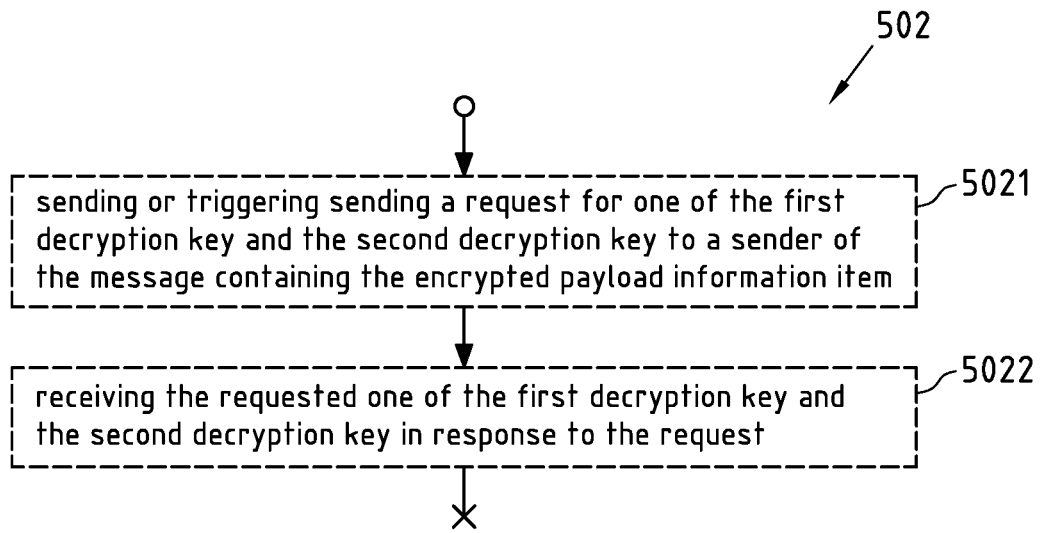
Figure 5C:
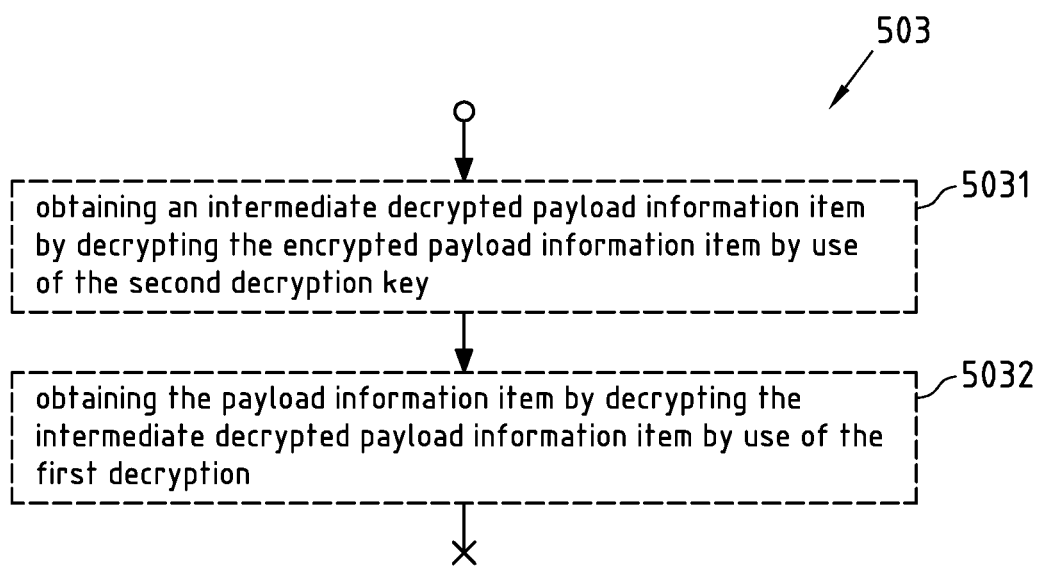

For example, obtaining the first decryption key and/or the second decryption key may comprise actions 5021 and 5022 as shown in FIG. 5*b*.

In action 5021, recipient device 200-1 sends or triggers sending a request for one of the first decryption key and the second decryption key to a sender of the message containing the encrypted payload information item. Sending the request to the sender of the message containing the encrypted payload information item may be understood to mean that the request is sent such that it is receivable by the sender or a sender device used by the sender for sending the message. For example, the request is sent by recipient device 200-1 via communication link 301 to sender device 100.

Without limiting the scope of the invention, it is assumed in the following that the request sent in action 5021 corresponds to the request received in action 404 of flowchart 400. As disclosed above, the request may be a request for Kelly and may contain an identification information item identifying the recipient using recipient device 200-1.

Subsequently, the recipient device 200-1 receives the requested one of the first decryption key and the second decryption key in response to the request (action 5022). Without limiting the scope of the invention, it is assumed in the following that the requested one of the first decryption key and the second decryption key received in action 5022 corresponds to the requested one of the first decryption key and the second decryption key sent by sender device 100 in action 406 of flowchart 400 as disclosed above. For example, Key1 may be received from sender device 100 in action 5022.

By use of the first decryption key and the second decryption key, the recipient device 200-1 decrypts the encrypted payload information item (action 503).

Decrypting the encrypted payload information item by use of the first decryption key and the second decryption key may mean that both the first decryption key and the second decryption key are used for decrypting the encrypted payload information item inaction 503. As a result of decrypting the encrypted payload information item the payload information item may be obtained in unencrypted form. Without limiting the scope of the invention, it is assumed in the following that the encrypted payload information item is decrypted in at least two subsequent decrypting steps in action 503 as exemplary shown in FIG. 5*c*.

In a first decrypting step 5031, recipient device 200-1 obtains an intermediate decrypted payload information item by decrypting the encrypted payload information item by use of the second decryption key.

The first decrypting step 5031 may corresponds to (e.g. reverse) the second encrypting step 4022. Accordingly, an asymmetric cryptography algorithm may be used in the first decrypting step when an asymmetric cryptography algorithm was used in the corresponding second encrypting step 4022.

For example, encrypted payload information item 800 may be decrypted by use of PRIV_Key_Rec1 and an asymmetric cryptography algorithm in the first decrypting step 5021.

As a result of the first decrypting step 5031, the intermediate decrypted payload information item is obtained, wherein the intermediate decrypted payload information may correspond to the intermediate encrypted payload information item obtained as a result of the first encrypting step 4021 and decryptable by the second decryption key.

An exemplary embodiment of such an intermediate decrypted payload information item 700 is shown in FIG. 6*b*. Intermediate decrypted payload information item 700 may be obtained by decrypting encrypted payload information item 800 in the first decrypting step 5031.

In a second decrypting step 5032, the recipient device 200-1 obtains the (unencrypted) payload information item by decrypting the intermediate decrypted payload information item by use of the first decryption key.

The second decrypting step 5032 may corresponds to (e.g. reverse) the first encrypting step 4021. Accordingly, a symmetric cryptography algorithm may be used in the second decrypting step when a symmetric cryptography algorithm was used in the corresponding first encrypting step 4021.

For example, intermediate decrypted payload information item 700 may be decrypted by use of Kelly and a symmetric cryptography algorithm in the second decrypting step 5022.

As a result of the second decrypting step 5031, the (unencrypted) payload information item is obtained. For example, the payload information item 1 is obtained by decrypting intermediate decrypted payload information item 700 in the second decrypting step 5032.

Figure 7:
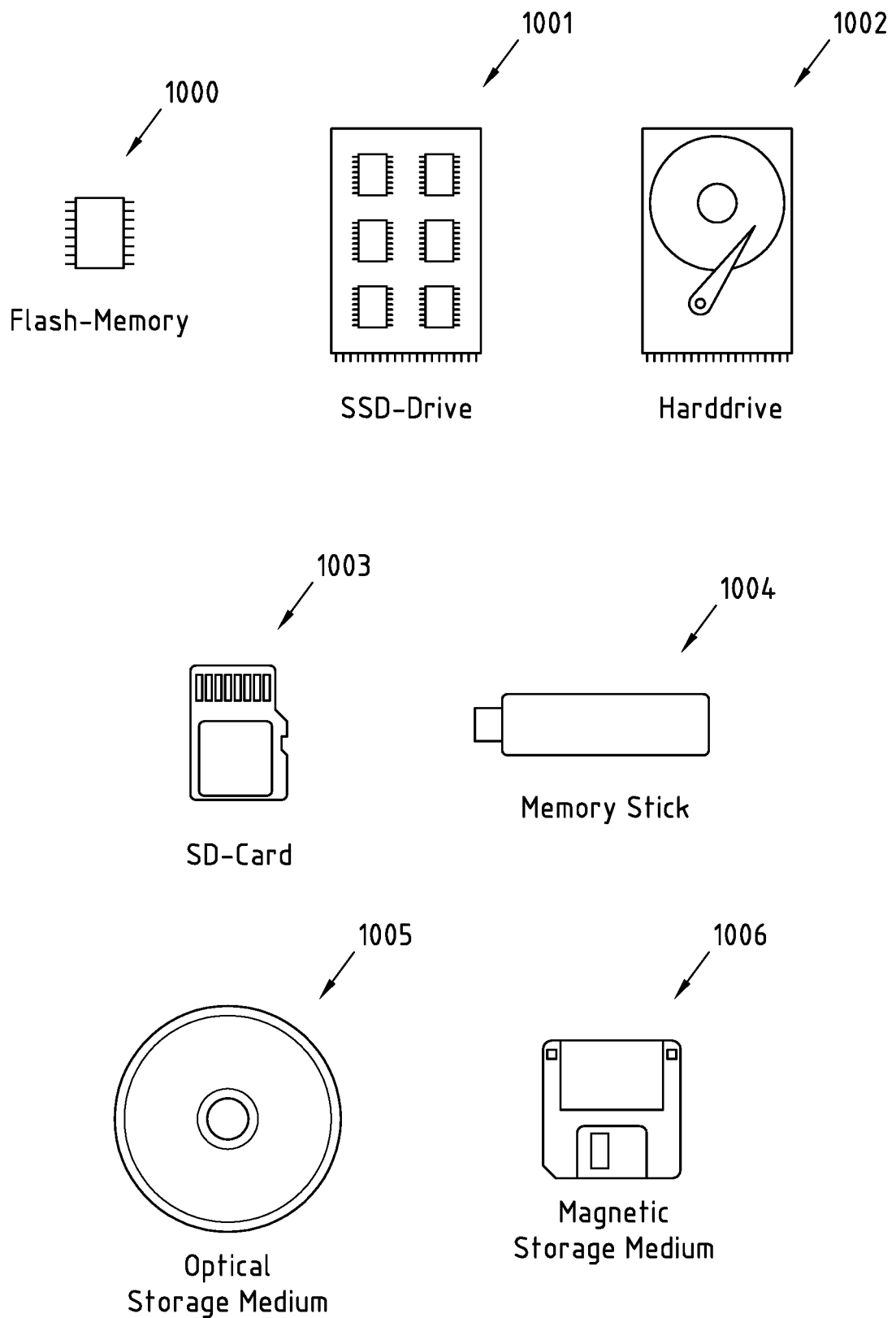
FIG. 7 is a schematic illustration of examples of tangible and non-transitory storage media according to the invention.

FIG. 7 is a schematic illustration of examples of tangible and non-transitory computer-readable storage media according to the present invention that may for instance be used to implement program memories 102 and 202 of FIGS. 1 and 2. To this end, FIG. 7 displays a flash memory 1000, which may for instance be soldered or bonded to a printed circuit board, a solid-state drive 1001 comprising a plurality of memory chips (e.g. Flash memory chips), a magnetic hard drive 102, a Secure Digital (SD) card 1003, a Universal Serial Bus (USB) memory stick 1004, an optical storage medium 1005 (such as for instance a CD-ROM or DVD) and a magnetic storage medium 1006.

Any presented connection in the described embodiments is to be understood in a way that the involved components are operationally coupled. Thus, the connections can be direct or indirect with any number or combination of intervening elements, and there may be merely a functional relationship between the components.

Any of the processors mentioned in this text, in particular but not limited to processors 101 and 201 of FIGS. 1 and 2, could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

It will be understood that all presented embodiments are only exemplary, and that any feature presented for a particular exemplary embodiment may be used with any aspect of the invention on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method performed by an apparatus, said method comprising:
    obtaining a payload information item that is to be communicated to at least one recipient,
    obtaining an encrypted payload information item by encrypting said payload information item to obtain an intermediate encrypted payload information item such that it is decryptable by use of a first decryption key and by encrypting said intermediate encrypted payload information item such that it is decryptable by use of a second decryption key,
    sending or triggering sending a message containing said encrypted payload information item to said recipient,
    receiving a request for one of said first decryption key and said second decryption key from said recipient,
    sending or triggering sending said requested one of said first decryption key and said second decryption key to said recipient in response to said request, and
    determining whether said recipient is allowed to access said encrypted payload information item, wherein said requested one of said first decryption key and said second decryption key is only sent or triggered to be sent to said recipient in response to said request, if it is determined that said recipient is allowed to access said encrypted payload information item,
    wherein said determining whether said recipient is allowed to access said payload information item is at least partially based on an authentication information item contained in said request for authenticating said recipient, an identification information item contained in said request for identifying said recipient, a validity time of said payload information item, a validity time of said requested one of said first decryption key and said second decryption key, a geographical validity of said one of said first decryption key and said second decryption key or a combination thereof.

2. An apparatus, said apparatus comprising at least one processor and at least one memory including computer program code, the at least one memory and the computer program code configured to, with the at least one processor, cause said apparatus at least to perform:
    obtaining a payload information item that is to be communicated to at least one recipient,
    obtaining an encrypted payload information item by encrypting said payload information item in its entirety by a first encryption key and then by a second encryption key such that it is decryptable by use of a first decryption key and a second decryption key,
    sending or triggering sending a message containing said encrypted payload information item to said recipient,
    receiving a request for one of said first decryption key and said second decryption key from said recipient,
    sending or triggering sending said requested one of said first decryption key and said second decryption key to said recipient in response to said request, and
    determining whether said recipient is allowed to access said encrypted payload information item, wherein said requested one of said first decryption key and said second decryption key is only sent or triggered to be sent to said recipient in response to said request, if it is determined that said recipient is allowed to access said encrypted payload information item,
    wherein said determining whether said recipient is allowed to access said payload information item is at least partially based on an authentication information item contained in said request for authenticating said recipient, an identification information item contained in said request for identifying said recipient, a validity time of said payload information item, a validity time of said requested one of said first decryption key and said second decryption key, a geographical validity of said one of said first decryption key and said second decryption key or a combination thereof.

* * * * *